United States Patent [19]

Tawil et al.

[11] Patent Number: 4,677,300
[45] Date of Patent: Jun. 30, 1987

[54] RADIATION DETECTION AND ACQUISITION SYSTEM

[75] Inventors: Riad A. Tawil, Kirtland; Kenneth Velbeck, Sagamore Hills, both of Ohio

[73] Assignee: Harshaw/Filtrol Partnership, Cleveland, Ohio

[21] Appl. No.: 637,434

[22] Filed: Aug. 3, 1984

[51] Int. Cl.$^4$ ............................................. G01T 1/20
[52] U.S. Cl. .................................. 250/366; 250/369
[58] Field of Search ....................... 250/361, 369, 366; 340/853, 861, 870.02

[56] References Cited

U.S. PATENT DOCUMENTS 3,514,750  5/1970  Pritchett et al. .................... 340/861
3,797,802  3/1974  Foote ................................ 250/361
3,935,462  1/1976  de Luca et al. .................... 250/366
4,413,250  11/1983 Porter et al. .................. 340/870.02

OTHER PUBLICATIONS

Desi, S. "Meth. for Improving the Perf. of X-ray Flur. Anal. Syst. at High Count Rates", Nuc. Inst. & Meth., 128, No. 3, pp. 603–605, (1975).

*Primary Examiner*—Carolyn E. Fields
*Assistant Examiner*—Richard Hanig
*Attorney, Agent, or Firm*—Renner, Otto, Boisselle & Lyon

[57] ABSTRACT

A radiation detection and acquisition system including a plurality of radiation detector modules each characterized by the integration in a compact package of a scintillator probe and supporting electronics which provide digital pulse count signals in response to detected scintillations that may be transmitted by a differential line driver on twisted shielded wire pairs over great distances to a count signal processing unit while maintaining signal integrity. The digital pulse count output is independent of the type of radiation detected whereby the same count signal processing unit may be employed with different detectors for respective different radiations. The detector module may also have an analog signal output so that it may be interfaced to an analog signal analyzer and a third output of the detector module provides a digital output signal that reflects saturation of the electronics due to a high rate of detected scintillation events (pulse pile-up). A remotely located, microprocessor-based signal processing unit is provided to acquire count signals received on multiple channels from respective detector probes, to display such data and to transmit such data to a controller or monitor for process control and/or monitoring. Acquisition is effected via at least one detector/processor interface module having plural transmission line inputs for connection to respective detection modules and a common transmission line output for connection of said inputs to the signal processing unit.

19 Claims, 8 Drawing Figures

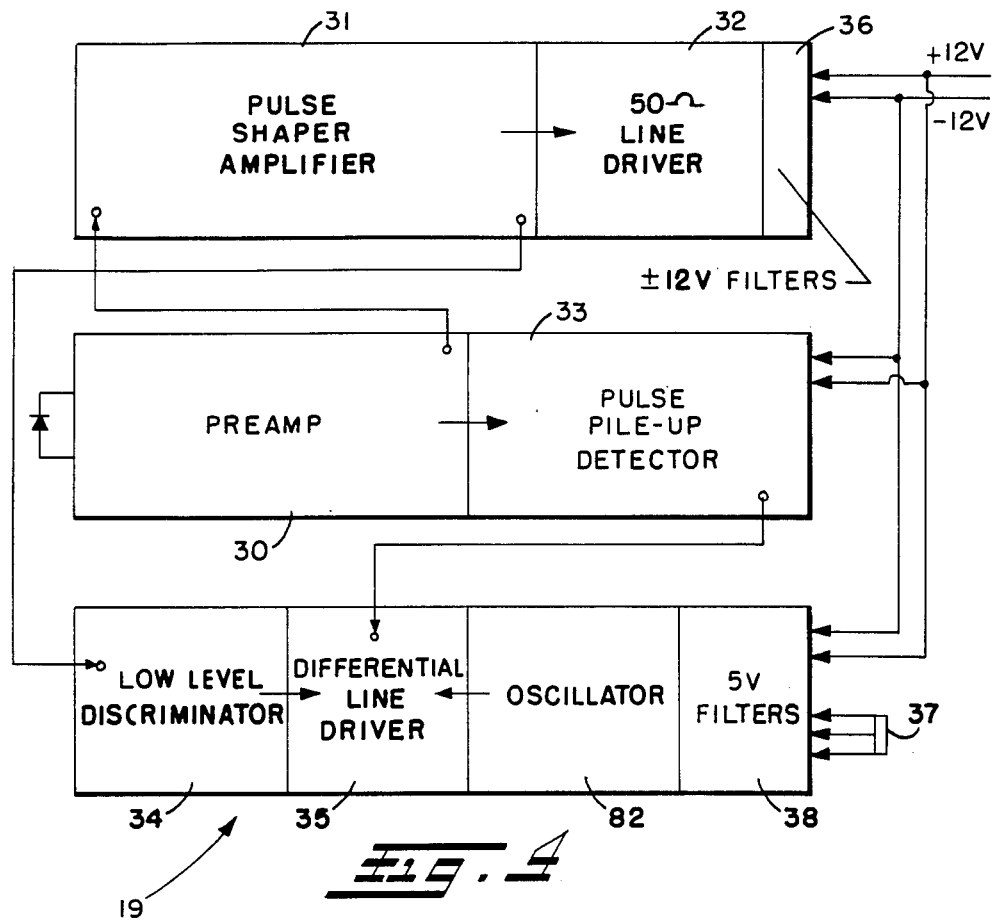
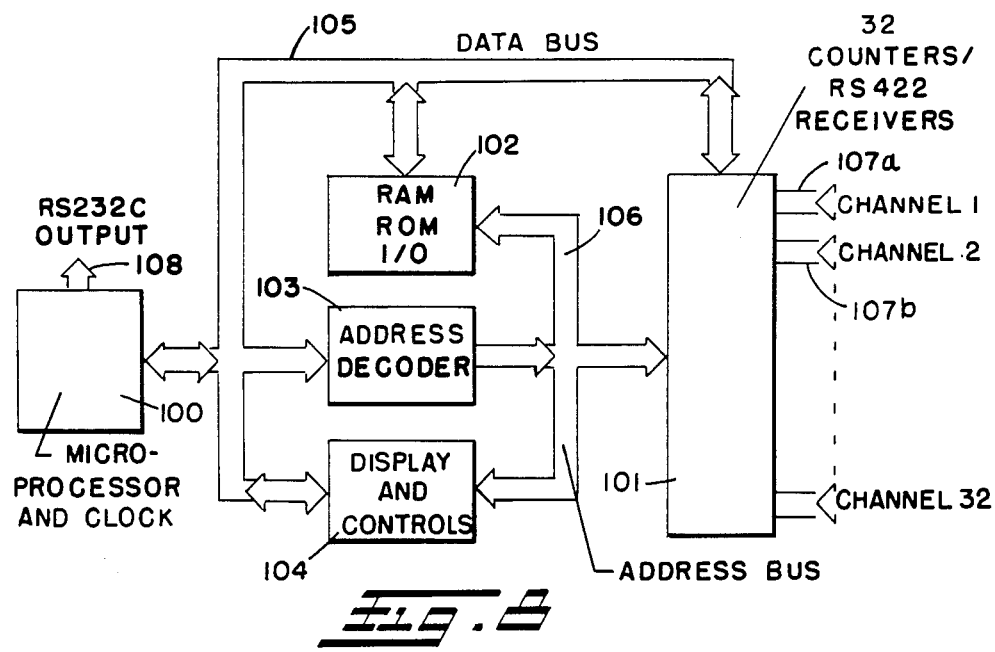

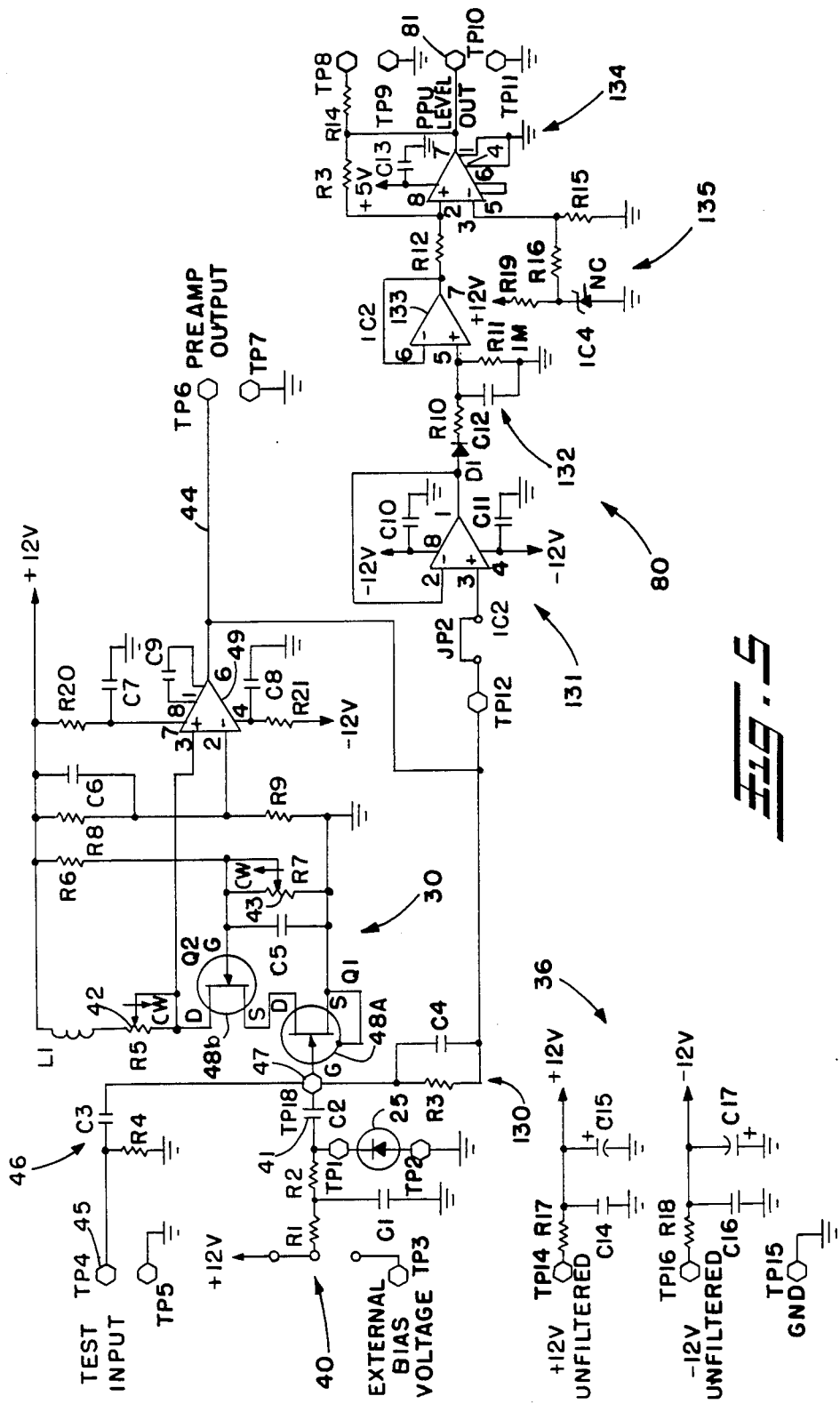

RADIATION DETECTION AND ACQUISITION SYSTEM

The invention herein disclosed relates generally to radiation detection and acquisition systems having wide applications including, inter alia, parts presence determination, process control, thickness gauging, moisture content analysis and radiation level detection such as in the vicinity of nuclear reactor chambers.

BACKGROUND

Radiation detection and acquisition systems have had many applications. Many such systems are characterized by a radiation detector probe employed at a radiation detection site and electrically coupled to a probe output signal processing unit commonly referred to as a nuclear instrumentation module. One common type of detector probe is based on a scintillator crystal combined with a photo-multiplier tube. The scintillator crystal converts impinging invisible radiation to bursts of visible light which are converted by the photo-multiplier tube to electrical analog signals. The radiation involved may be gamma rays, X-rays, high energy or thermal neutrons, etc.

Heretofore, the scintillator crystal and photo-multiplier tube were packaged in a common housing for positioning and mounting at the detection site. The analog output of the photo-multiplier tube would be line coupled to the usually remotely located nuclear instrumentation module which processed the analog output of the photo-multiplier tube so as to provide, for example, pulse count data to an associated display or system controller.

One problem with this prior system was that the nuclear instrumentation module had to be located relatively close to the detector probe to avoid loss of signal integrity resulting from induced line noise, line losses, etc. Also, the nuclear instrumentation modules could not be used universally with different detector probes operative to sense respective types of radiation. Instead, a specific instrumentation module had to be used for each radiation type detector probe. Moreover, the output of such system was not as reproduceable or repeatable as might be desired in some applications leading to larger margins of error or reduced reliability.

Still another problem was the variance in outputs from detector probe to detector probe. This necessitated tedious and time consuming calibration of the nuclear instrumentation modules to gain matching data output under identical radiation conditions. Many times a good match could not be obtained because of substantial variance in the detector probes and calibration limitations of the nuclear instrumentation modules.

Such systems also required a separate nuclear instrumentation module for each detector probe in multiple channel systems. In addition to being costly, large control panels were required to house the nuclear instrumentation modules and associated equipment such as pulse count rate displays.

SUMMARY OF THE INVENTION

The present invention provides a novel radiation detector probe or module and associated acquisition system which eliminates or minimizes the aforesaid and other problems, and which has a wide range of applications. Briefly, the radiation detector module is characterized by the integration in a compact package of a scintillator probe and supporting electronics which provide digital pulse count signals in response to detected scintillations that may be transmitted by a differential line driver on twisted shielded wire pairs over greater distances, as on the order of several thousand feet, to a count signal processing unit while maintaining signal integrity. The digital pulse count output is independent of the type of radiation detected, i.e., gamma rays, X-rays, thermal neutrons, etc., whereby the same count signal processing unit may be employed with different detectors for respective different radiations. In the preferred embodiment, the same electronics are employed in the detector probe for different radiations and radiation energies through analog gain adjustment of the scintillator probe output. The detector module may also have an analog signal output so that it may be interfaced to an analog signal analyzer such as a conventional nuclear instrumentation module. Moreover, and importantly in some applications, a third output of the detector module provides a digital output signal that reflects saturation of the electronics due to a high rate of detected scintillation events (pulse pile-up). The persistence of this pulse pile-up signal for periods greater than a preselected time period such as one millisecond may be related to the occurrence of a criticality condition.

Further in accordance with the invention, a single, remotely located, microprocessor-based signal processing unit is provided to acquire count signals received on multiple channels from respective detector probes, to display such data and to transmit such data to a controller or monitor for process control and/or monitoring. Acquisition is effected via at least one detector/processor interface module having plural transmission line inputs for connection to respective detection modules and a common transmission line output for connection of said inputs to the signal processing unit.

According to one aspect of the invention, a radiation detector module comprises a scintillator for receiving radiation to be detected and for emitting scintillation light in response to received radiation, a photoelectric transducer optically coupled to the scintillator for generating electrical analog output signals in repsonse to detected scintillations, a low level discriminator for generating pulse count signals in response to analog output signals exceeding a threshold level, and a differential line driver for digitally transmitting the pulse output signals to a remotely located differential line receiver as may be associated with a signal processing unit.

According to a further aspect of the invention, a radiation detector and acquisition system comprising: a plurality of radiation detector modules operative to generate and transmit pulse count output signals representative of detected radiation events, a remotely located signal processing unit operative to receive and process in parallel on respective channels the output signals transmitted by the plurality of detector modules, and at least one interface module having plural transmission line input for connection to respective detection modules and a common transmission line output for connection of the inputs to the signal processing unit.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 4 is a diagrammatic illustration of the electronics of the radiation detection module of FIG. 2;

FIGS. 5-7 are circuit schematics of the electronics illustrated in FIG. 4; and

FIG. 8 is a diagrammatic illustration of a microprocessor based signal processing unit according to the invention.

DETAILED DESCRIPTION

Figure 1:
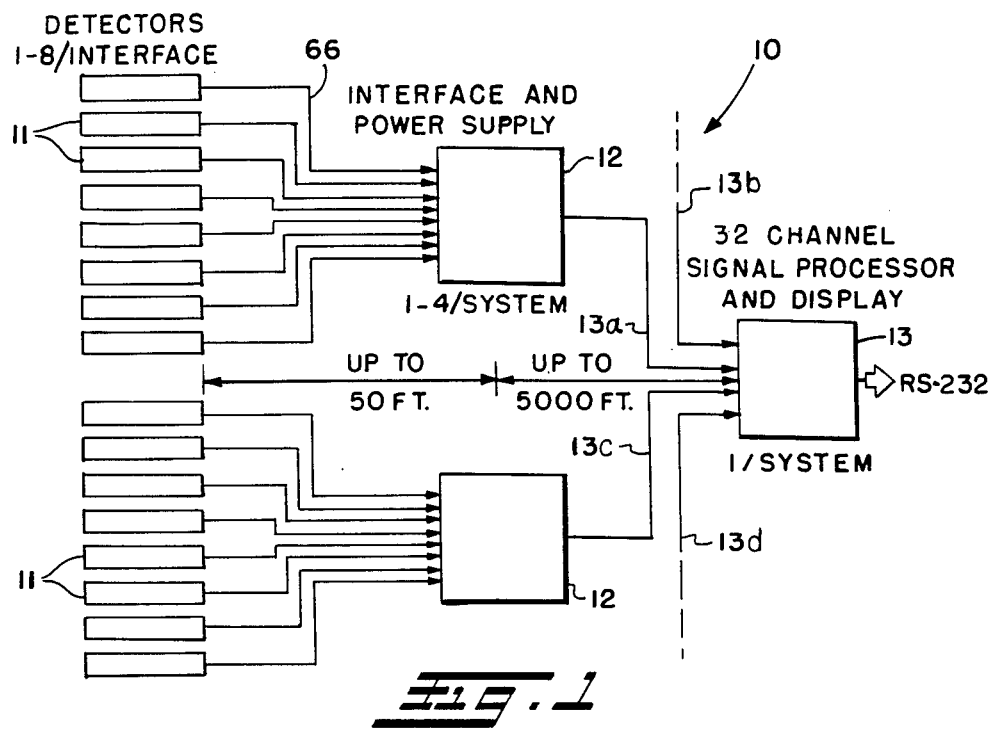
FIG. 1 is a diagrammatic illustration of a radiation detection and acquisition system according to the invention.

Referring now in detail to the drawings and initially to FIG. 1, a radiation detection and acquisition system according to the invention is diagrammatically illustrated and designated generally by reference numeral 10. The system 10 generally comprises a plurality of pulse counting radiation detection modules 11, one or more detector/processor interface modules 12, and a microprocessor based signal processing unit 13. In the illustrated embodiment, up to eight detector modules may be coupled to each interface module and up to four interface modules may be coupled to the processing unit for parallel data acquisition on thirty-two channels.

By way of example, the system 10 may be utilized for parts presence detection at up to thirty-two sites. The component to be tested for presence of a part is passed or placed between a source of selected radiation, e.g., Ba-133, Cs-137, Co-60 or thermal neutron sources of radiation, and a radiation detector located in the shadow of the component. The radiation selected is of a type that will be attenuated (partially blocked) by a different amount depending upon the presence or absence of the part being tested for so as to result in different pulse count rates being generated by the radiation detector when the part is present and not present, respectively. The ratio of the count rate obtained by dividing the count rate when the part is absent by the count rate when the part is expected to be present may be used to determine the status of the presence of the part. That is, a ratio of about one within statistical variance will be indicative of the absence of the part whereas a ratio substantially greater than one will be indicative of the presence of the part. The ratio may be inputted, for example, to a system controller or monitor to implement appropriate control operations in response thereto or simply to record the absence of a part from the identified component for subsequent corrective action. The invention also may be used for gauging, inspection, and testing of materials, e.g., metal sheet, whereby, for example, the number of counted radiation caused pulses at the detector would be a function of metal thickness—the higher the count rate, the thinner the material.

The Radiation Detection Module

Figure 2:
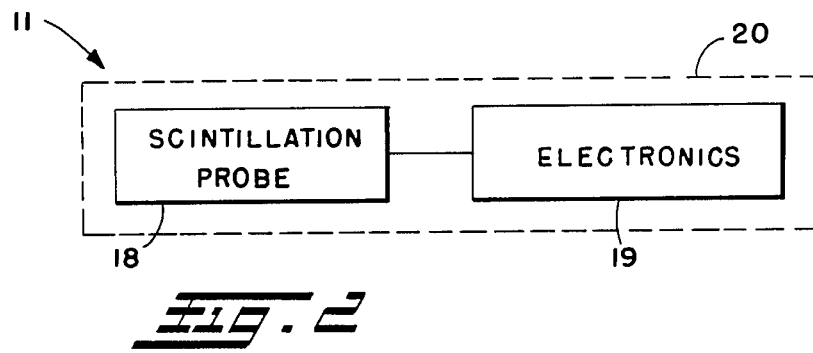
FIG. 2 is a diagrammatic illustration of a radiation detection module according to the invention.

As diagrammatically illustrated in FIG. 2, the radiation detection module 11 generally comprises a scintillation probe or detector front end 18 integrated with suppporting electronics 19 in a single housing represented by broken lines 20. The housing 20 may be designed for easy and convenient mounting at the testing site and, as will be appreciated, may be quite compact.

Figure 3:
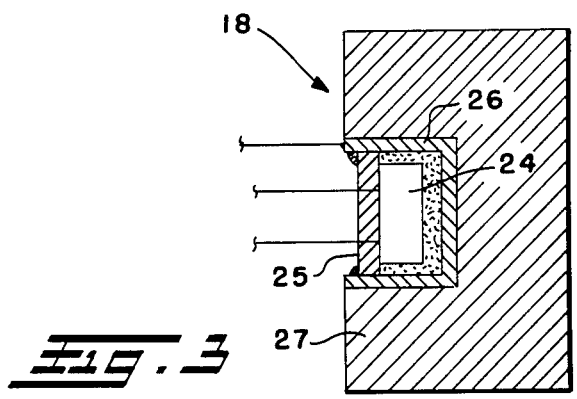
FIG. 3 is a schematic sectional view through the scintillation probe of the radiation detection module of FIG. 2.

As depicted in FIG. 3, the scintillator probe 18 includes a scintillation element 24 optically coupled to a photo-electric transducer 25. In the illustrated solid state probe, the scintillation element may be a scintillation crystal such as a LiI(Eu) crystal for detection of thermal neutrons, and the transducer may be a silicon photodiode. By way of example, the crystal may be a $10 \times 10 \times 10$ mm. cube optically coupled to a silicon photodiode, such as a Hamamatsu 1723-01 photodiode, having a $10 \times 10$ mm. sensitive area. The crystal and diode preferably are hermetically sealed in an aluminum can 26 which provides the necessary electrostatic shielding, and the hermetically sealed assembly may be embedded in a thick, say 25 mm. thick, slab 27 of polyethylene preferably before interfacing to the supporting electronics 19. Another scintillation crystal that may be used is a CsI(Tl) crystal.

The scintillator probe 18 of the foregoing type detects thermal neutrons in their interaction with the Li component of the crystal:

$$^{6}\text{Li} + 1_n \rightarrow {}^{4}\text{He} + {}^{3}\text{H} + Q$$

The reaction energy, $Q = 4.78$ MeV, is shared by the alpha and triton inversely to their respective masses. The neutron induced peak in the scintillator appears around 3 MeV, this permitting discrimination against all natural gamma rays. Approximately 750 eV of energy absorbed in the crystal is effective in producing one electron-hole pair. The mechanism of such reaction may be further summarized as follows.

The linear absorption coefficient for the scintillation crystal is the sum of the coefficients of its atomic constituents. These constituent atoms are: $^{7}$Li (0.033 Barns), $^{6}$Li (950 Barns), Iodine (6.3 Barns) and Eu activator (4300 Barns). The effective neutron capture in iodine and in Europium limits the efficiency of the crystal. Gamma rays produced in these two reactions escape the crystal or produce scintillations that are not counted by the electronic circuitry 19, which has a low level discriminator set to exclude counting such scintillations.

For a LiI(Eu) crystal with the natural isotopic abundance of $^{6}$Li(7.5%), the linear absorption coefficient is 1.47 cm.$^{-1}$, and that for the enriched $^{6}$Li crystal (96%) is 16.7 cm.$^{-1}$. The latter 96% enriched $^{6}$Li-component crystal is preferred.

More particularly, the scintillator probe 18 detects thermal neutrons by counting the gamma rays emitted in the nuclear reaction between the $^{6}$Li and moderated or thermal neutrons. The invention, as is described in greater detail below, discriminates against fast neutrons and all gamma radiation; however, the discrimination level can be altered, as desired, by appropriate adjustments, e.g. of the respective potentiometers, gains, etc. shown in the drawings.

In FIG. 4, the electronics or electronic circuitry 19 is diagrammatically illustrated. The circuitry 19 generally comprises a low noise charge sensitive pre-amplifier 30, a pulse shape amplifier 31, a driver 32 for delivering an analog output signal, a pulse pile-up detector 33, a fast comparator low level discriminator 34 with adjustable threshold, and a differential line driver 35 for providing a digital pulse output signal and a pulse pile-up output signal. Appropriate electric power is provided from a conventional power supply, as to +12 and −12 volt filters 36 in FIG. 5, and to a conventional input regulator 37 (if necessary or desired) connected to 5 volt filters 38 as seen in FIG. 4.

Figure 6:
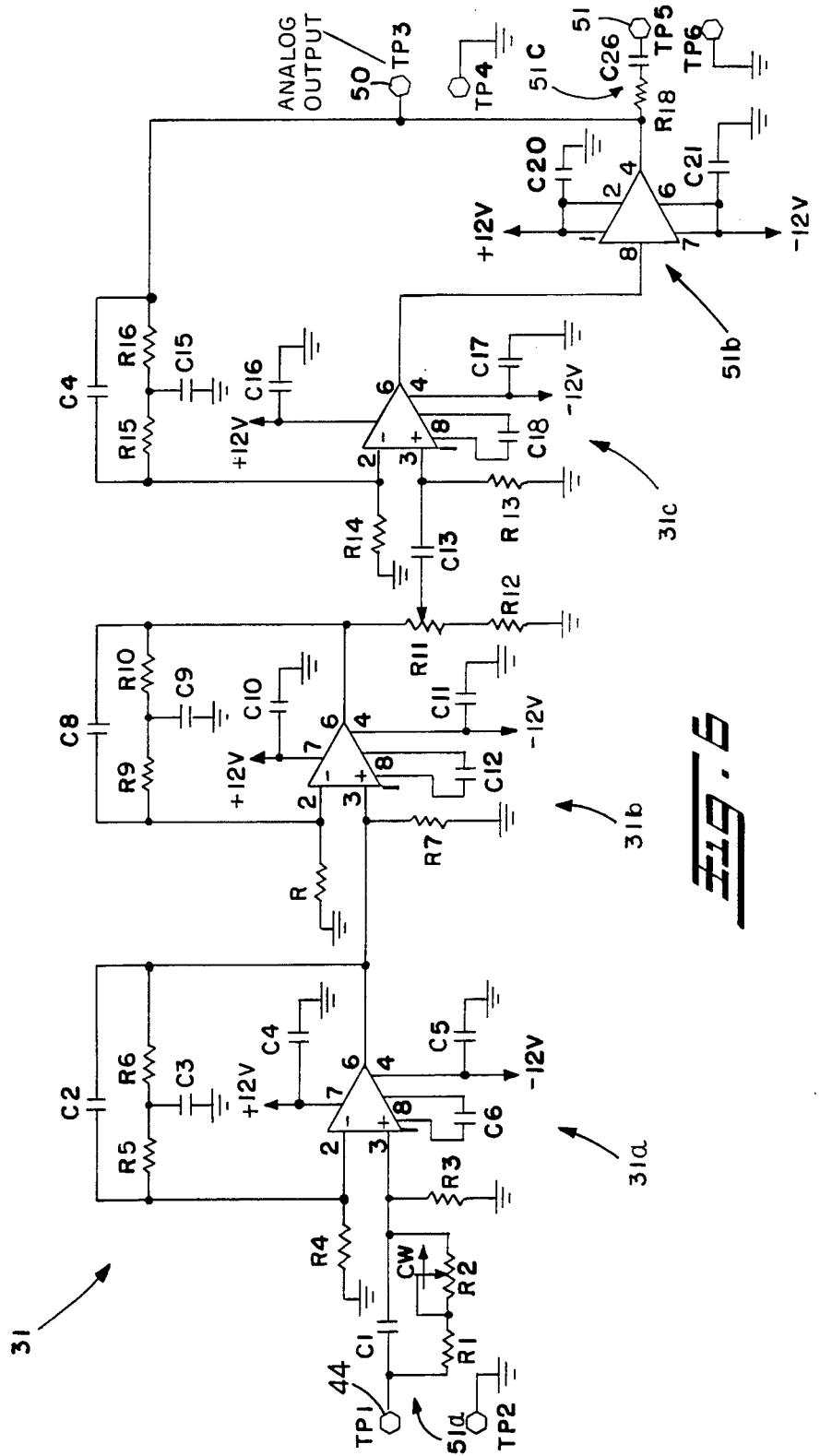
Figure 7:
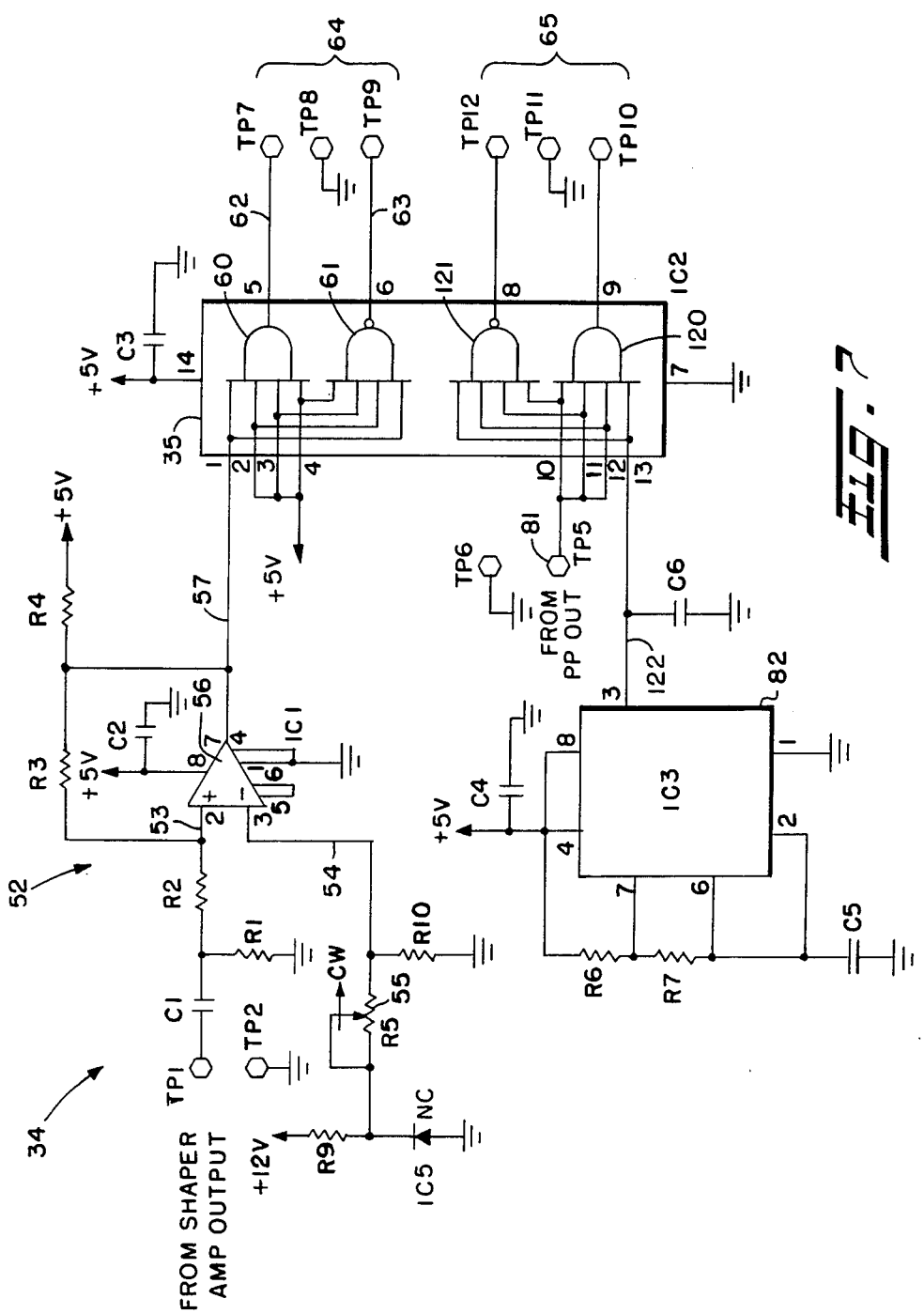

Referring now to the circuit schematic seen in FIGS. 5-7, the photodiode 25 is reverse biased by a biasing circuit 40 and is coupled by input capacitor 41 to the input of a low noise charge sensitive pre-amp 30. The pre-amp 30 includes adjustment potentiometers 42 and 43 to produce on line 44 a desired voltage output signal for the incident radiation peak energy. If desired, a test input terminal 45 may be provided and connected by an RC circuit 46 to the input 47 of the pre-amp 30.

In the pre-amp circuit 30, as light, for example visible or other light, is produced in the scintillation probe 18, such light impinges on the photosensitive diode 25 causing the same to tend to discharge the capacitor 41. Elimination of such light permits the re-charging of the capacitor 41 from the +12 volt source illustrated in FIG. 5. The charging and discharging of the capacitor 41 affects the transistors 48a and 48b, which in turn provide inputs to the charge sensitive operational amplifier 49 of the pre-amp 30 to produce on line 44 pulses proportionately representative of the intensity of light impinging on the photosensitive diode 25. The response time of the pre-amp 30 is less than one microsecond, with a decay time constant of 0.5 millisecond; these values, of course, are exemplary only and others could be employed by altering the various components employed in the circuitry.

The output of the pre-amp 30 on line 44 is inputted to the pulse shaper amplifier 31 (FIG. 6) which produces amplified analog signals that are delivered to an analog output terminal 50 buffered, for example, for a 50 ohm coaxial cable, and to a terminal or line 51, which is AC coupled to the input of the discriminator 34 (FIG. 7). The pulse shaper amplifier 31 actually is formed of three conventional low pass filter stages 31a, 31b and 31c. The input to the pulse shaper amplifier 31 received at terminal 44 from the output of the pre-amp 30 is delivered via an RC differentiation circuit 51a to the first low pass filter stage 31a, and the output from the third low pass filter stage 31c is coupled via an impedance matching amplifier circuit 51b to the analog output 50 and via the RC circuit 51c to the output terminal 51 for AC coupling to the discriminator 34 (FIG. 7).

The decay time of the differentiation circuit is set by capacitor C1 and R3 (both of FIG. 6). A pole zero adjusting potentiometer R2 (FIG. 6) is provided to adjust for signal undershoot. The parallel connected, feedback capacitors and resistors across the operational amplifiers determine the cut-off frequency and the capacitors C3, C9 and C15 (all of FIG. 6) are provided for damping. The filters decrease the rise time of the signal and produce a more symmetric wave shape. The adjustable gain potentiometer R11 (FIG. 6) included between the second and third filter stages 31b and 31c is provided to accommodate photodiodes with various current gains. The output of the third filter stage 31c will be a substantially symmetrical wave shape with an amplitude of say 5 volts adjusted by the potentiometer R11 (FIG. 6). This gain adjust permits the scintillation probe to be matched to the specific radiation source, i.e., to fix the analog signal peak height to the peak energy of the incident radiation. The rise and fall of the signal output of the third filter stage 31c should be complete within ten microseconds. This output signal is then AC coupled to the discriminator 34 (FIG. 7).

The discriminator 34 (FIG. 7) includes a high speed comparator 52 having its positive input 53 connected to the output 51 of the shaper amp 31. The negative input 54 is connected to a low level threshold adjusting potentiometer 55. Only when the shaper amp 31 output on line 51 exceeds the threshold level determined by the circuitry coupled with respect to the potentiometer 55 and adjusted to a level set by the latter upon the occurrence of a scintillation of sufficient energy detected by the diode 25 will a pulse output be passed by amplifier 56 in the comparator 52 to the differential line driver 35 via line 57 thereby effectively excluding pulses generated by low level energy scintillations resulting from all gamma radiation below 2.0 MeV, for example. That is, a squared pulse output is obtained on line 57 when the input signal to the comparator 52 is greater than the threshold voltage determined by the circuitry coupled with respect to the potentiometer 55. A feedback resistor R3 (FIG. 7) is included to induce two millivolts of hysteresis into the circuit to avoid isolations when the input signal level passes through the threshold region. A resistor R4 (FIG. 7) tied to the +5 volt source is included as shown on the output of the comparator to produce a TTL compatible output signal supplied to the differential line driver 35 via line 57. The discriminator 34 preferably is adjustable from 10 KeV to 30 KeV discrimination levels for Am-241. The discriminator is set by adjustment of potentiometer 55 to result in reproduceable count rates from one detector to another for the same source/detector configuration.

The differential line driver seen at 35 in FIG. 7 preferably is an RS-422 balanced differential line driver which digitally transmits the pulse counting signals received for the discriminator 34. Such device is very temperature stable. The differential line driver 35 is a conventional solid state electronics integrated circuit device, such as one identified by Model No. DS8830N. For each input channel to the differential line driver 35, there are two logic gates, one an AND gate 60, and one a NAND gate 61. The illustrated connections in FIG. 7 provide three of the inputs of each of the gates 60, 61 with a +5 voltage level signal, and one input to each of those gates is connected to line 57 to receive the discriminated squared wave signal output from the low level discriminator 34. Accordingly, when there is a logic one signal on line 57, for example upon occurrence of a scintillation detected by the radiation detection module 11 exceeding the threshold level, the AND gate 60 will produce a logic one signal on its output line 62, and the NAND gate 61 will produce a logic zero signal on its output line 63. Similarly, when a zero signal is applied on line 57, the AND gate 60 produces a logic zero at its output 62 and the NAND gate 61 produces a logic one signal at its output 63.

Significantly, since the outputs on lines 62, 63 always are opposite each other, signal integrity with minimum loss is possible for transmission over relatively long distances of, for example, 3,000 feet, as was mentioned above. The advantage to such lengthy transmission is the ability to locate a single signal processing unit 13 (including a receiver operated in balanced configuration with the driver 35) at a remote location from the radiation detection modules 11. The signal processing unit 13, then, conveniently may monitor many radiation detection modules 11, plural detector/processor interface modules 12, and also be conveniently coupled to other computer, electronic, transmission, etc. equipment, as is illustrated schematically, for example, in FIG. 1.

As will be appreciated, the circuitry of the signal processing unit 13 (FIG. 8) preferably includes an RS-422 balanced differential line receiver for combining the digital pulse count signals with its inverted image for further processing, such combining eliminating any induced line noise that may occur during transmission. Moreover, since information output by the differential line driver 35 is a digital pulse (TTL like), it is possible accurately to transmit the data represented by such digital signal (pulse) over relatively long distances exceeding, for example, 3,000 feet without too excessive a loss of signal integrity, especially when shielded twisted pair cable are used to couple such signals, say, to the signal processing unit (FIGS. 1 and 8).

It is the intended function of the circuitry illustrated in FIGS. 1-7 to produce an electrical digital (TTL like) output pulse for counting in the signal processing unit 13 for every scintillation caused by a gamma ray. However, at high rates of detected scintillations, the electronic circuitry may become saturated with the result that the analog and digital outputs will be zero, as when the preamplifier saturation limit is exceeded. This gives a false indication of low or nonexistence of radiation incidence when in fact radiation incidence is extremely high. In order to reflect the saturation of the electronics, the pulse pile-up circuit seen at 80 in FIG. 5 provides an output signal on line 81 reflecting such saturation. The persistence of the pulse pile-up output signal for more than, for example, a few milliseconds when accompanied by a zero digital output at terminal 51 and/or zero analog output at terminal 50 reflects the occurrence of a critical condition. This has particular importance in the usage of the detection module to monitor radiation, for example, in the vicinity of a nuclear reactor. When a critical condition is detected, an alarm may be sounded to advise of such critical condition. In the case of parts presence detection, saturation of the electronics normally would not present a problem and the pulse pile-up circuitry then need not be employed. By provision of the oscillator seen at 82 in FIG. 7, the pulse pile-up output signal may be provided in the form of a 10 KHz square wave.

In summary, the above described detector module 19 generates three outputs. An analog signal output at terminal 51 that may be interfaced to a multi-channel analyzer such as one of conventional type. Accordingly, the detector 19 may be utilized in existing systems employing nuclear instrumentation modules as in conventional manner. The detector module 19 also produces a digital pulse count output at terminal 64 that may be directly coupled to a counter or, in the preferred embodiment, to the signal processing unit 13. The third output of the detector module 19 at terminal 65 reflects the saturation of the electronics due to pulse pile-up.

As will be appreciated, the scintillator probe 18 may take other forms than the illustrated solid state probe. For example, the scintillator probe may comprise a scintillation crystal optically coupled to a photomultiplier tube having its output inputted into electronic circuitry generally of the foregoing type. If a photomultiplier tube is utilized, there necessarily is provided in the detection module appropriate circuitry for connection to a high voltage source in addition to the low voltage source necessary to operate the electronic circuitry.

The Interface Module

Each interface module seen at 12 in FIG. 1 performs two functions: supplies power to the detection modules and provides the continuity of the detector signals. Preferably, the interface modules are located relatively close to the detection modules connected thereto but may be at considerable distance from the signal processing unit. With respect to the supply of power to the detection modules, the interface module may include a low voltage power supply for driving the detection module electronics and a high voltage power supply for driving a photomultiplier tube in the event of its being employed in the detection module in place of the illustrated solid state device. The detector/processor interface module 12, accordingly, includes, for example the shielded twisted pair cable 64, shielded twisted pair cable 65, and appropriate power connections, the sum thereof being represented by cable 66 in FIG. 1, for each of the radiation detector modules 11; and cable 13a represents the sum of all the shielded twisted pair cables 64, 65 employed for each of the radiation detection modules 11 shown in FIG. 1 in order to couple the same to the signal processing unit 13.

Signal Processing Unit

The signal processing unit indicated at 13 in FIG. 1 is microprocessor based and software controlled and functions to acquire the data from the detection modules, to display such data and to transmit such data to an external controller such as via an RS-232 port. It will be appreciated that a person having ordinary skill in the art may write appropriate software to carry out such functions. The digital output signal from the detectors is received via the four transmission lines 13a–13d connecting the interface modules to the signal processing unit. The data acquisition and processing module 13, also referred to as the signal processing unit, shown in FIG. 8 includes a microprocessor and clock 100, an RS-422 differential line receiver 101, RAM and ROM memory, input/output ports 102, an address decoder 103, a visual display and controls 104, and connections among the same via a data bus 105 and an address bus 106. The microprocessor 100 preferably includes the appropriate circuitry to provide an RS232C output at 300 Baud or 9600 Baud and in essentially conventional manner to monitor and to control operation of the other components in the data acquisition and processing module 13.

For example, during initial operation or start-up of the data acquisition and processing module 13, according to computer program software stored in the ROM portion of the memory 102, self-diagnostics may be carried out. Thereafter, the microprocessor may effect a reset of the RS-422 differential line receiver. Such receiver is a counter type device having, for example, thirty-two individual binary or digital counters, each connected to receive input signals from the detector/processor interface module 12. Such module 12 includes eight output lines represented by the line 13a (FIG. 1), each being connected to a different one of the respective channel inputs 107a, 107b, etc. to respective counters in the differential line receiver 101. After a counting period timed by the microprocessor 100, a signal stopping further counting can be applied to the differential line receiver 101. Thereafter, the microprocessor 100 operating through the address decoder 103 may select respective counters in the differential line receiver 101 to read out the count information therefrom to the display and controls 104, for example for visual display and/or for control of any system being monitored by the apparatus 10 and/or for storage in the RAM portion of the memory 102. The display and controls 104 preferably include a seven-digit light emitting diode display or other type of display which designates two of the digits for identifying which radiation detection module 11 (channel) is being displayed at a given time and five digits designated for identifying the count rate of the particular radiation detection module (channel). Preferably the microprocessor 100 also is capable of bunching count rate data from the differential line receiver and/or that stored in RAM 102 in binary coded decimal form for transmission at the RS232C output 108 to an external device (not shown) for further use, storage, control function, etc.

In the example illustrated in the drawings, the signal processing unit 13 acquires data from thirty-two channels, the data being received on respective pairs of shielded twisted pair cables, such as those represented at 64 and 65 together in FIG. 7, one such pair of shielded twisted pair cables being required from each of the radiation detection modules 11. The signal processing unit 13 may be adjusted or programmed to select a data sampling time interval during which pulses are counted by the differential line receiver 101; for example, in a parts presence system, such data sampling time may be preset to one second. The data may be stored in memory 102 and may be displayed automatically or under manual test by the display and controls 104.

Upon receipt of a sample and transmit instruction the microprocessor 100, for example, may be caused to complete its current data sampling cycle, to perform a self-diagnostics, to redefine the data sampling period, if necessary, and to clear all of the channels, i.e. counters, in the differential line receiver 101. At the completion of data acquisition, the data may be reformatted and presented both at the display 104 and/or transmitted via the communications port 108. An exemplary bundling of data may include the use of a ninety-six character binary coded decimal word, three characters for each radiation detection module 11. The self-diagnostics may include tests for checking operability of the memory 102 and/or other portions of the data acquisition and processing module/signal processing unit 13.

In the event that excessive radiation impinges on the scintillation probe 18 causing the pile-up of pulses at the pre-amp 30 essentially driving the same into saturation or alternatively essentially causing a steady state output signal on line 44 because the incoming pulses are received faster than the system can respond to the same, the electronics 19 (FIG. 2) and described in greater detail with respect to FIGS. 5-8, would tend to indicate falsely a lack of receiving pulses or in any event a substantial number of pulses. The pulse pile-up detector 80 is coupled via terminal 81 to the differential line driver 35 to indicate whether or not the critical condition of pulses being received too rapidly, i.e. saturation, is occurring. More specifically, coupled to the AND and NAND gates 120, 121 in the differential line driver 35 is the oscillator 82. The oscillator 82 produces a pulse signal on line 122 which is coupled to one of the inputs to each of the gates 120 and 121, and all the other gates thereof are connected to the terminal 81 from the pulse pile-up detector 80. Accordingly, if a logic zero signal appears at terminal 81, the output from AND gate 120 will remain at logic zero, and the output from NAND gate 121 will remain at logic one level, the same indicating no pulse pile-up condition. However, when the input signal to terminal 81 changes to a logic one, indicating a critical or saturation condition, namely pulse pile-up, the gates 120, 121 will pass the pulse received from the oscillator 82 to the shielded twisted pair cable represented at 65 (FIG. 7) to signal such critical or saturation condition as to the data acquisition and processing module 13.

In the pulse pile-up detector 80 seen in FIG. 5 as long as a pulsing type signal appears at junction 47 within the acceptable rise and fall times of the system, such signal which is passed via RC circuit 130 to the input of buffer 131 periodically will charge the capacitor 132 and will allow the capacitor to discharge slowly. Accordingly, the output from the buffer 133 will be inadequate to drive the comparator amplifier 134 to produce a positive or logic one signal at terminal 81 overcoming the bias provided by the zener diode reference voltage circuit 135. On the other hand, the terminating of adequately spaced pulses at junction 47 and the producing of a steady state output on line 44 will produce a continuing positive signal at the output of the amplifier 131. The integrator 132 then will charge and will not discharge fast enough. The integrator amplifier 133 then will drive the comparator amplifier 134 beyond the threshold level of the zener diode reference voltage circuit 135 causing a logic one signal to be produced at terminal 81 and, therefore, causing a critical condition/saturation/pulse pile-up signal information to be provided on the shielded twisted pair cable 65.

We claim:

1. A radiation detector comprising:
   scintillator means for receiving radiation to be detected and for emitting scintillation light in response to received radiation,
   photoelectric transducer means optically coupled to said scintillator means for generating analog electrical pulses in response to detected scintillations at an output thereof, and
   electronic circuit means electrically coupled to the output of said transducer means, said electronic circuit means including amplifier means for amplifying said analog electrical pulses, low level discriminator means for generating pulse count signals in response to the amplified analog electrical pulses exceeding a threshold level, pulse pile-up detector means for generating a pulse pile-up signal in response to saturation of said electronic circuit means, and balanced differential line driver means for digitally transmitting the pulse output signals and pulse pile-up signal to a remotely located differential line receiver, said pulse pile-up detector means including oscillator means for producing a pulse signal and means for passing the pulse signal from said oscillator means to said line driver means for transmission thereby in response to saturation of said electronic circuit means.

2. A radiation detector as set forth in claim 1, wherein said transducer means includes a photodiode and said amplifier means includes a charge sensitive amplifier electrically coupled to said photodiode.

3. A radiation detector as set forth in claim 1 further comprising means for outputting the analog electrical pulses to a remotely located receiver therefor.

4. A radiation detector comprising:

scintillator means for receiving radiation to be detected and for emitting scintillation light in response to received radiation, photoelectric transducer means optically coupled to said scintillator means for generating analog electrical pulses in response to detected scintillations at an output thereof, electronic circuit means electrically coupled to the output of said transducer means, said electronic circuit means including amplifier means for amplifying said analog electrical pulses, low level discriminator means for generating pulse count signals in response to the amplified analog electrical pulses exceeding a threshold level, pulse pile-up detector means for generating a pulse pile-up signal in response to saturation of said electronic circuit means, and balanced differential line driver means for digitally transmitting the pulse output signals and pulse pile-up signal to a remotely located differential line receiver, and a housing in which each of said scintillator means, transducer means and electronic circuit means is mounted.

5. A radiation detector and acquisition system comprising:

a plurality of radiation detector modules as set forth in claim 4, a remotely located signal processing unit operative to receive and process in parallel on respective channels the digital output signals transmitted by said plurality of detector modules, and at least one interface module at a location remote from said detector modules and said signal processing unit having plural transmission line inputs for connection to respective detection modules and a common transmission line output for connection of said inputs to said signal processing unit.

6. A system as set forth in claim 5, wherein said interface module includes a power supply for powering each detector module connected thereto.

7. A system as set forth in claim 5, wherein there are plural interface modules connected to a respective plurality of detector modules and to said signal processing unit by a respective common transmission line.

8. A system as set forth in claim 5, wherein said signal processing unit includes a differential line receiver for the pulse count output signals of a respective detector module.

9. A system as set forth in claim 5, wherein said interface module is located more proximate the detector modules connected thereto than said signal processing unit.

10. A system as set forth in claim 5, wherein said signal processing unit is microprocessor-based and includes an asynchronous communication port for connection to another microprocessor control device.

11. A system as set forth in claim 5, wherein said signal processing unit includes a pulse rate count display selectively connected to each channel to display the respective count rate.

12. A radiation detector comprising:

scintillator means for receiving radiation to be detected and for emitting scintillation light in response to received radiation;

photoelectric transducer means optically coupled to said scintillator means for generating electrical charge pulses in response to detected scintillations;

charge sensitive amplifier means coupled to said transducer means for producing analog pulse signals proportionately representative of the intensity of the electrical charge pulses;

pulse shaper amplifier means for amplifying and shaping the analog pulse signal to a substantially symmetrical wave shape;

low level discriminator means for generating pulse count signals in response to the amplified and shaped analog pulse signals exceeding a threshold level;

differential line driver means for digitally transmitting the pulse count signals to a remotely located differential line receiver;

pulse pile-up detector means for generating a pulse pile-up signal in response to saturation of said charge sensitive amplifier means; and a housing in which each of said scintillator means, transducer means, charge sensitive amplifier means, pulse shaper amplifier means, discriminator means, line driver means and pulse pile-up detector means is mounted.

13. A radiation detector as set forth in claim 12, wherein said pulse shaper amplifier means includes plural low pass filter stages serially connected between said charge sensitive amplifier means and discriminator means, and gain adjusting potentiometer means electrically connecting two of said plural filter stages for adjusting the amplitude of the amplified and shaped analog pulse signal.

14. A radiation detector as set forth in claim 13, wherein said charge sensitive amplifier means is provided with adjustment potentiometer means to adjust the amplitude of the charge pulse output of said charge sensitive amplifier means.

15. A radiation detector as set forth in claim 12, wherein said charge sensitive amplifier means is provided with adjustment potentiometer means to adjust the amplitude of the charge pulse output of said charge sensitive amplifier means.

16. A radiation detector as set forth in claim 12, wherein said transducer means includes a photodiode and said scintillator means includes a scintillation crystal optically coupled to said photodiode.

17. A radiation detector as set forth in claim 16, wherein said crystal and diode are hermetically sealed in a metal can which provides electrostatic shielding.

18. A radiation detector as set forth in claim 12, further comprising resistance driver means for transmitting the amplified and shaped analog pulse signals to a remotely located receiver therefor.

19. A radiation detector as set forth in claim 12, wherein said discriminator means includes a high speed comparator having one input connected to the analog pulse signal output of said pulse shaper amplifier means and its other input connected to threshold adjusting means.

* * * * *